United States Patent Office 3,108,028
Patented Oct. 22, 1963

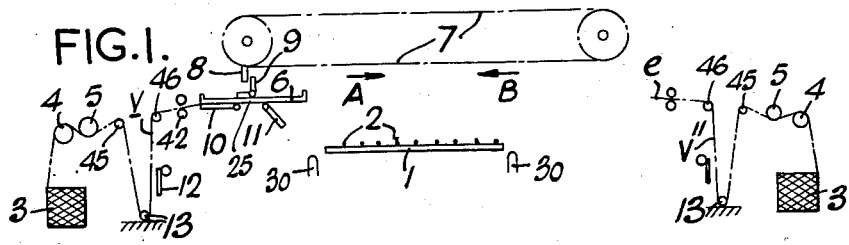
FIG. 1.
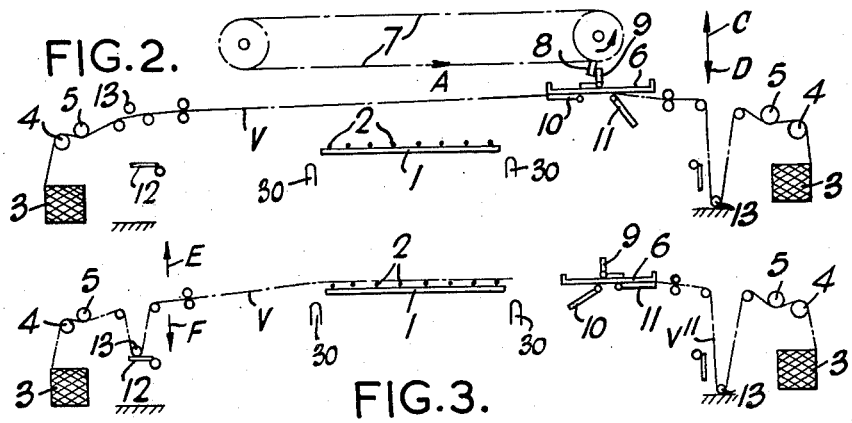
FIG. 2.
FIG. 3.
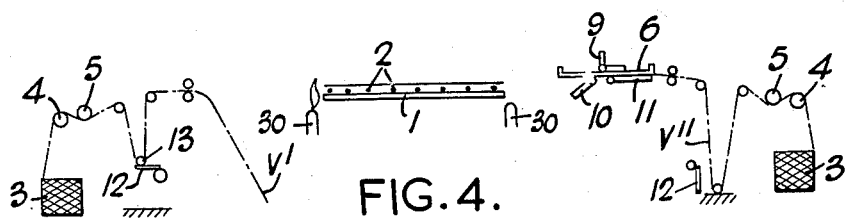
FIG. 4.
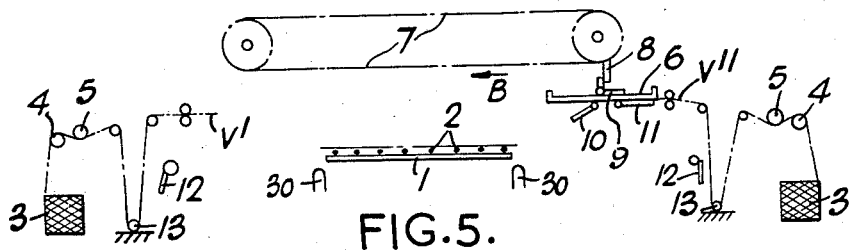
FIG. 5.

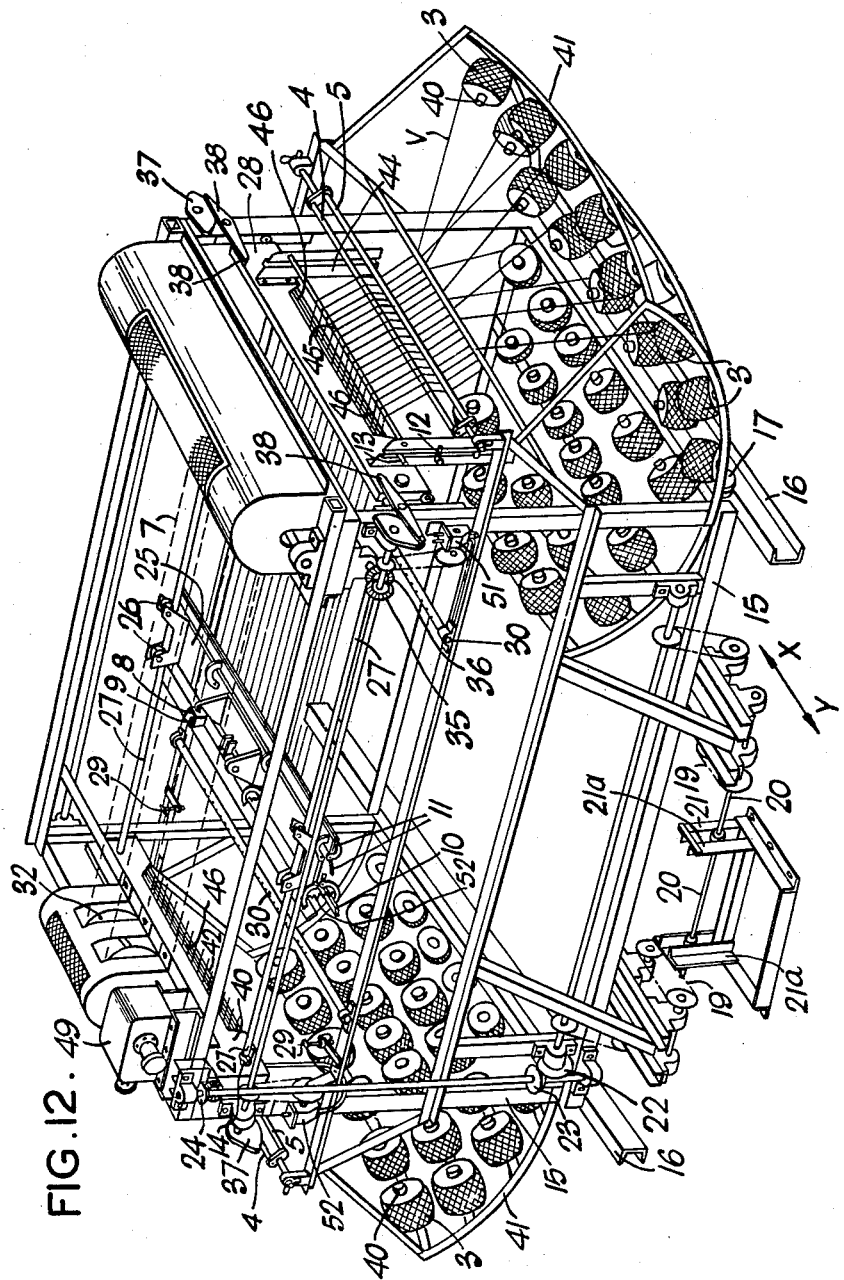

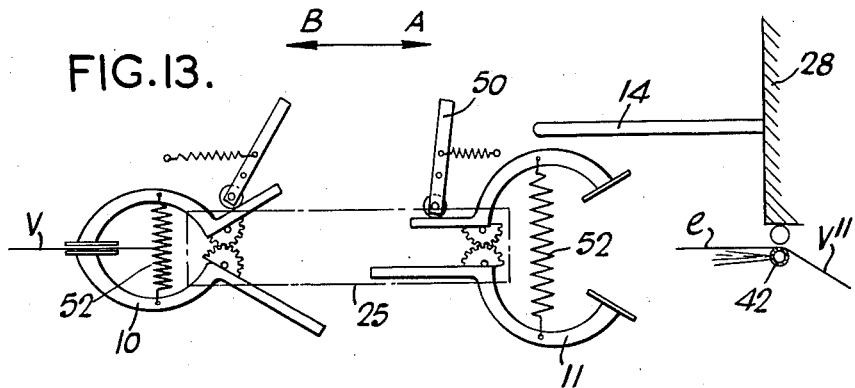
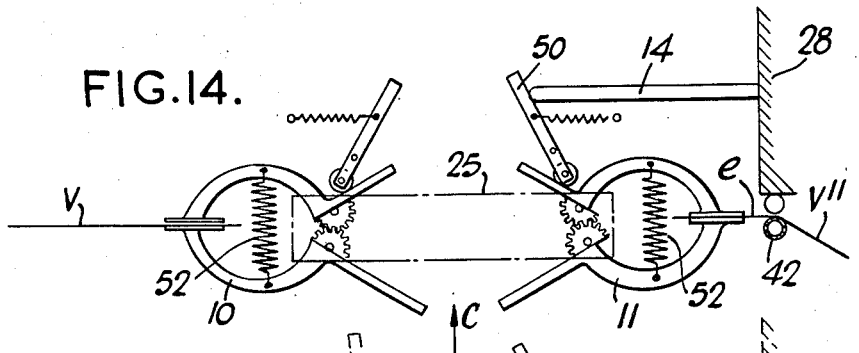
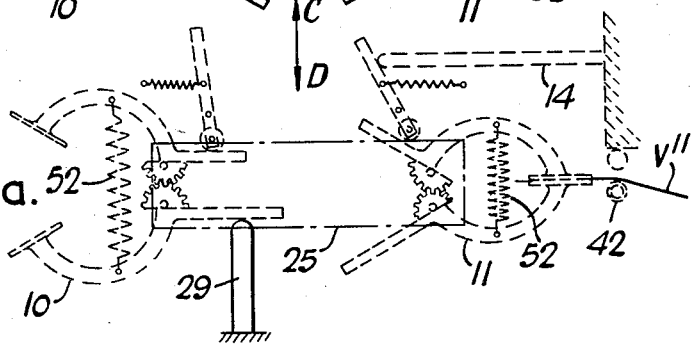

3,108,028
METHOD AND APPARATUS FOR THE REINFORCEMENT OF GLASS FIBRE WEBS OR MATS
Gerhard Sprunck, Schutzenstrasse 2, Wertheim am Main, Germany, and Werner Hugo Wilhelm Schuller, Fort Saskatchewan, Alberta, Canada
Filed Oct. 1, 1959, Ser. No. 847,036
7 Claims. (Cl. 156—178)

The invention relates to a method and apparatus for the reinforcement of mats or webs made of glass fibre or the like.

It is known that thin sheets, mats, webs or the like of staple fibre such, for example, as glass staple fibre, are extensively used for widely varying purposes such, for example, as for insulation. Thin single-layer mats built up from glass staple fibres disposed irregularly and un-orientated, have been found to be particularly suitable for subsequent treatment with bitumen, synthetic resins, or the like. Mats of this kind are, for example, frequently used as carrier or base material for roofing, or as pipe wrapping material for the protection of steel tubes against corrosion, since, as compared with carrier or base materials made of organic fibre, they have the advantage of being moisture-resistant and incombustible.

The only disadvantage was that, despite the binder used in the production of the mat, the cohesion of the fibres was poor, and for many purposes inadequate.

It has been proposed to improve the tensile strength of the mat by the application of reinforcing means such, for example, as yarns or threads, rovings, or strips. The application of the reinforcing means involves no difficulty provided it is applied in a direction which corresponds to the direction of movement of the conveyor belt constituting the support in the production of the mat. It is, in such a case, sufficient for the reinforcement which is wound on spools or bobbins, to be provided at a position above the conveyor belt, and to be lowered on the web so as to be applied thereon and securely combined therewith by means of a binder and a contact roller, which ensures relative cohesion of the fibres in the web.

This type of reinforcement which is hereinafter referred to as "longitudinal reinforcement" is, however, only capable of contributing to an improved tensile strength in the longitudinal direction, whereas it is in many cases desirable that, in order to obtain fabric-like properties, a substantial transverse tensile strength should also be imparted to the mat. In practice, this involves substantial difficulties. Imitation of processes known in the textile industry was impossible as the mat was built up from staple fibres of finite length which were disposed irregularly and without orientation, and which were provided with a liquid binder while being formed.

It has been found that in many cases, the porosity of such mats as are reinforced in the longitudinal and transverse directions, is on account of the readily absorbent base mat, superior to that of fabrics. Fabrics with closely woven warp and weft threads have poor porosity and inadequate absorptivity with respect to the synthetic resins or impregnating means subsequently applied, whereas in fabrics with loosely woven warp and weft threads the impregnating means passes through the open meshes of the fabric.

The invention relates to a method and apparatus for the transverse application of reinforcing means in the form of staple fibre, slivers, yarns or threads, strips, or continuous glass filament yarns, twines, made from endless continuous fibres or the like, on an intermittently or continuously moving base mat, sheet, or the like, made of staple fibre from thermoplastic masses such, for example, as glass staple fibre or the like.

Although it is possible to use staple fibres or continuous fibre, it is particularly advantageous for the finished product, to use slightly twisted, or untwisted glass staple fibre slivers which, due to their fluffiness or fleeciness and relatively larger area of contact give a particularly efficient bond with the base mat, since it has been found that the final strength of reinforced glass mats is not so much dependent upon the strength of the components themselves as on the fact that these components should not be separated when subjected to tensile stresses, that is to say, the cohesion of the reinforcement to the support exceeds the tensile strength of the combination, base mat plus reinforcement.

In accordance with the invention gripping means are provided which grips several reinforcements disposed in parallel groups or series, the gripping means being provided so as to be moved over the mat or web at right angles to the direction of movement and entraining and depositing the gripped reinforcing means, the connection between each of the opposite ends, after application of the reinforcing means, and its adjoining ends, at the bobbin side, being then cut and the free ends thus left moved into a position of readiness for being gripped by the gripper in the next transverse movement. After depositing the reinforcing means, the gripper may be returned by a rapid return motion so as to grip and drawoff fresh slivers or the like.

Base mat having a thickness of from 0.004 to 0.060 mm. and produced in accordance with British patent specification No. 686,564 has been found to produce particularly good results on account of its uniform thickness over the entire width of the mat, as well as on account of its substantial tensile strength by virtue of the use of staple fibres of different lengths obtained by this process and used in the production of the mat. In accordance with the invention furthermore, a double gripper is provided which carries out transverse reciprocating motions across the mat in both directions entraining and depositing simultaneously in the shortest time up to one hundred lengths of reinforcement.

According to the invention moreover, means are provided by which mat, or the like may be continuously produced and moved on, for example, to a drying oven or kiln, the means including for this purpose a carriage on which the gripper is mounted, and which is adapted to reciprocate in the direction of movement of the conveyor belt, that is to say, at right angles to the direction of movement of the gripping means, at a rate which is synchronised with the speed of the conveyor belt.

The invention is diagrammatically illustrated by way of example in the accompanying drawings, and is hereinafter described in detail with reference to these drawings.

FIGURE 1 shows the apparatus according to the invention in the initial phase of the forward movement;

FIGURE 2 shows the end phase of the forward movement of the gripper carriage;

FIGURE 3 shows the apparatus illustrated in FIGURE 1, after application of the transverse reinforcing means on the sheet to be reinforced;

FIGURE 4 shows the completion of the transverse reinforcing layer;

FIGURE 5 shows the initial phase of the return movement and the reinforcing means in the position of readiness for re-gripping on the opposite side;

FIGURE 12 shows the complete arrangement of the apparatus according to the invention;

Figure 6:
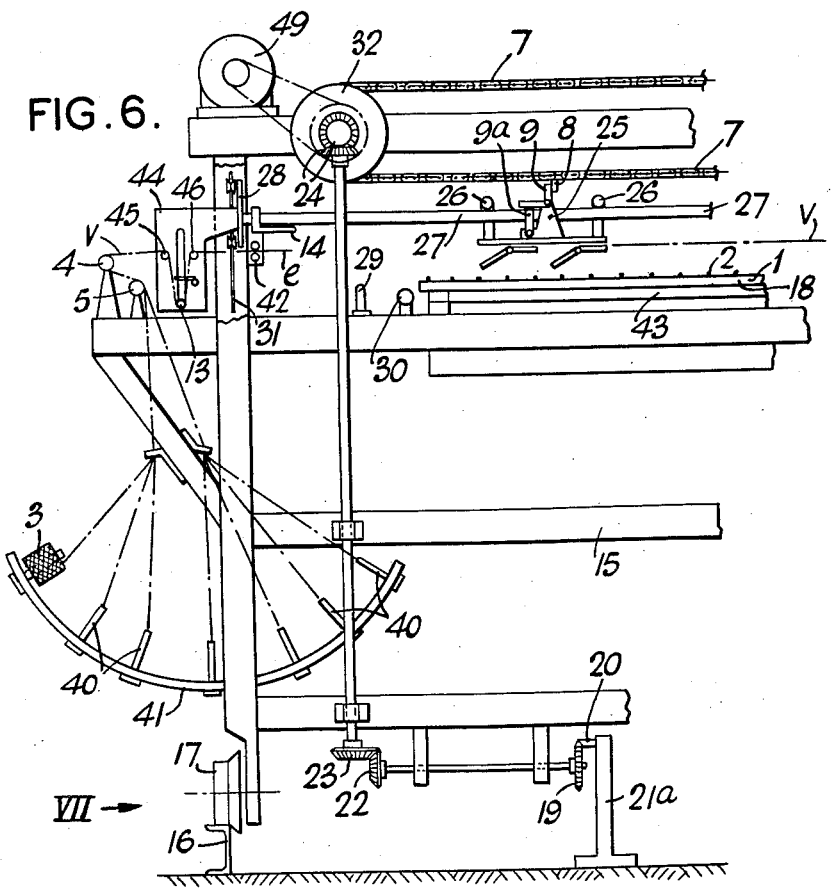
FIGURE 6 shows on an enlarged scale a side elevation of one-half of a modified construction of apparatus according to the invention.

FIGURE 13 shows the gripper carriage 25 and the gripper 10 and 11 in the movement phase direction A shortly before the end phase;

FIGURE 14 shows the end phase of the gripper carriage movement A and the closing of the gripper mouth 11; and FIGURE 14a shows in dotted lines the lowering in the direction D of the entire gripper track, by which the gripper mouth 10 is opened when it contacts the release lever 29.

FIGURES 1 to 5 show schematically the complete operation of applying the transverse reinforcing means.

With reference to FIGURE 1 of the drawings, 1 is the base sheet or mat such, for example, as a glass staple fibre mat, to be reinforced, on the upper surface of which longitudinal reinforcing means 2 in the form of yarns, slivers, bands, strips or the like have been applied.

The apparatus according to the invention as illustrated in FIGURE 12 consists of a carriage 15, which reciprocates on wheels 17 on a rail track 16 in the direction X—Y. The drive is effected by a chain 19 mounted on the carriage frame and having a flight attachment or follower 20 which moves in a guide slot 21 provided in the guide 21a which is anchored to the foundation or bed plate. The drive of the chain 19 is transmitted through bevel gears 22, 23 and 24 from the drive shaft of the traversing chains 7. The speed can be adjusted to conform exactly to the speed of the receiving belt 18 (FIGURE 6), so that the carriage 15 moves in synchronisms with the receiving belt 18 for the distance determined by the axial distance between the sprockets 19a and 19b (FIGURE 7) and is reversed by the rotation of the chain.

Figure 9:
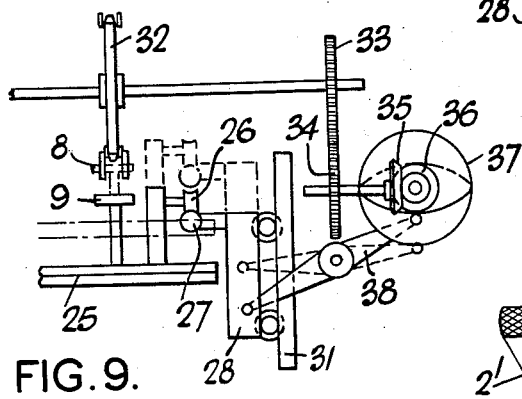
FIGURE 9 is a corresponding front elevation.

The support 28 (FIGURES 6 and 12) on which the gripper track 27 is mounted, is inserted in cam levers 38 (FIGURE 9) and guided on rollers by guides 31 in the frame 15 of the carriage. The other ends of the cam lever 38 bear against disc cams 37. As the disc cams 37, 38 rotate the mounting support 28 is moved up and down by the cam levers 38 as shown in dotted and unbroken lines in FIGURE 9. The drive of the disc cams 37 is effected through bevel gears 35 and 36 and a pair of gear wheels 33, 34 from the drive shaft of the traversing chains 7. The gripper carriage 25 runs on rollers 26 on the gripper track 27 (FIGURE 6) and by the flight attachment or follower 8 provided on the traversing chain 7 and in engagement with the cam lever 9, is drawn to the two end positions across the conveyor belt 18. On the outer side of the mounting supports 28 is secured a guide 44 having guide rods 45 and 46, in the slot or gap between which, a restoring rod 13 is adapted to slide up and down for the transverse position or layer of the rovings. 4 and 5 are brake shafts for the transverse reinforcing means.

Figure 7:
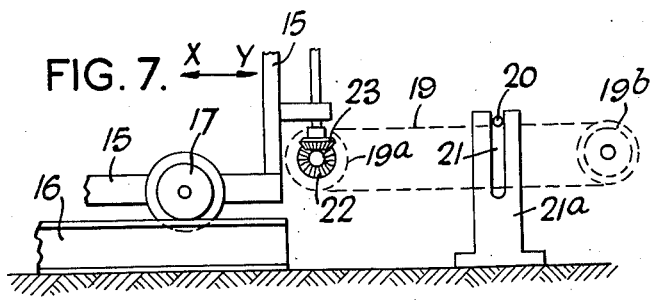
FIGURE 7 shows a partial side elevation of the apparatus shown in FIGURE 6 viewed in the direction of the arrow VII.
Figure 8:
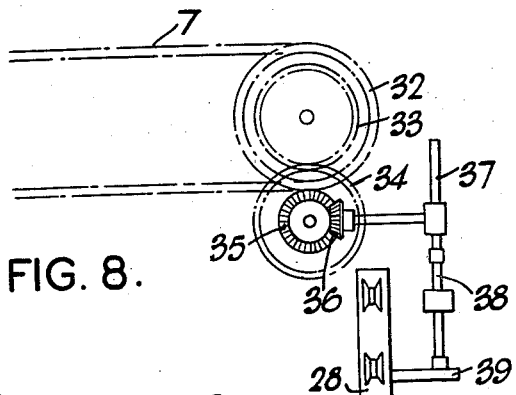
FIGURE 8 shows a side elevation of component parts of the apparatus according to the invention.

The reinforcing means $v$ are passed from the bobbins 3 over the braking shaft 4 and 5 and the guide rods 45 and 46 through holder 42, and the ends $e$ of the reinforcing means are gripped as, for example, by the gripper 10. The flight attachment or follower 8 provided on the chain 7 which is in engagement with the cam lever 9, draws the gripper carriage 25 in the direction of the arrow A (FIGURES 1 and 2), whereby the gripped reinforcing means $v$ are stretched transversely across the mat 1 and 2, so that the restoring rod 13 is raised to the level of the guide rods 45 and 46. Upon termination of the movement of the gripper carriage 25, the flight attachment or follower 8 is released by the release lever 14 which releases the entrainment means or cam lever 9 by reversing the pawl 9a (FIGURE 6).

As illustrated in FIGURES 13 and 14, the gripper mouth 11 is at the same time closed by a tension or draw spring 52 as a result of a locking arm 50 being released by the release lever 14, so that the ends $e$ of the reinforcing means $v''$, which are blown by a stream of air from the holder 42 into the mouth, are gripped.

During the downward movement D (FIGURES 14 and 14a) of the gripper track, the gripper mouth 10 is opened by contacting the release lever 29. The tensioned transverse reinforcing layer is thus withdrawn by the dead weight of the restoring rod 13, which falls down in the direction F (FIGURE 3) until it contacts the pawl 12. The transverse reinforcing means, in a stretched-out position and in parallel relation, then rest on the mat 1 and 2.

As the carriage 15 moves in synchronism with the conveyor belt 18, the band burner 30 is ignited, so that the transverse reinforcing means $v$ between the conveyor belt and the bobbins are melted at a position close to the edge of the conveyor belt (FIGURE 4).

When the entire gripper track 28 is raised by the cam 37 through the cam lever 38 in the direction C (FIGURE 2), the pawl 12 is released by a release lever provided on the frame 15, so that the restoring rod 13 can continue to fall through in the direction F (FIGURE 3) on to a stop thus drawing the ends of the reinforcing means $v'$ to the position of readiness illustrated in FIGURE 5. During the entire operation, the contra-rotating or oppositely directed chain 7 has rotated until the flight attachment or follower 8 by engagement with the cam lever 9 is able to withdraw the gripper carriage 25 in the direction indicated by the arrow B, and the whole cycle of operations hereinbefore described is thus repeated.

The means described hereinbefore may be replaced to give the same result by other similar means, for example:

The chain transmission may be replaced by worm transmissions or the like, the raising and lowering of the whole gripper track 28 by hydraulic or pneumatic means instead of by the cam-controlled mechanical device, the gas burners 30 by electric burners or by shears or the like.

Where it is desired to increase the speed of production to beyond the output provided by the apparatus provided in accordance with the invention, several such apparatus may be provided in series.

The chain 7 may be replaced by a spindle drive. Moreover, the carriage not necessarily run on rails which are mounted on the base; it may also run on rails disposed approximately at the level of the conveyor belt in a manner similar to crane trolleys.

As illustrated in FIGURE 6, the reinforcing means, in the form of yarns, rovings, strips or the like, are held in readiness wound on spools or bobbins, one of which is shown at 3. The spools are mounted on spool holders 40, a substantial number of which, for example, fifty on each side, are provided in a cage-like frame 41. It will be understood that the reinforcing means such as slivers, yarns or the like may be drawn-off from a single large spool previously prepared for the drawing-off operation and carrying, for example, 50 or 100 slivers, which has been prepared on a warp-beam-like device as conveniently used in the textile industry.

It will be understood that the grippers 10 and 11 by which the ends of the reinforcing means are gripped and held in position may be replaced by any other means serving the same purpose. Thus, for example, extended nozzles which draw-in air, similar to those known, for example, in vacuum cleaners, may be used which are moved over the ends of the reinforcing layer until the ends are raised, gripped and entrained thereby during the return movement. The control may be effected in known manner by providing the carriage 25 with a two-way cock, which contacts a stop, thus opening or interrupting the connection to the exhauster source at the end of each movement. In order to simplify the drawings, FIGURES 6 to 9 show respectively about one half only of the carriage containing the entire apparatus and half of the control means provided for the vertical movement of the gripper track 28. In the case of intermittently moving conveyor belts with the work carried out on one side only, it will be understood how to proceed, for example, to complete the frame of the carriage shown in FIGURE 6. If, as is the case with continuously moving belts, the reinforcing means are applied from both sides of the conveyor belt, then the described means may follow in reverse relationship.

Figure 10:
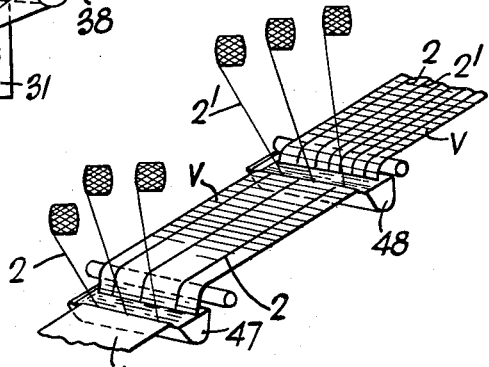
FIGURE 10 shows the method of producing a longitudinal and transverse reinforcement in accordance with the invention.
Figure 11:
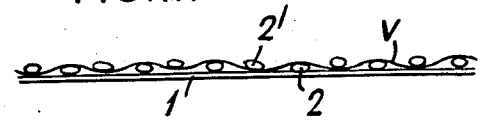
FIGURE 11 shows a part sectional elevation of a mat reinforced in accordance with the invention.

FIGURE 10 shows by way of example an advantageous method for carrying out the invention. In accordance with this method, part, for example, half, of the required longitudinal reinforcements 2, before passing through a first binder bath 47, are applied in double spacing of, for example 1½″ on the mat or web 1 produced, and are then drawn through the first immersion bath. The transverse reinforcing layer is then applied in single spacing by the apparatus of the invention. The other part, for example the other half, of the longitudinal reinforcing layer, is then wetted with binder in a second immersion bath 48 and applied on the lattice previously produced, in such manner that the longitudinal reinforcement 2′ is laid with the same spacing between the spaces of the first longitudinal layer, in such manner as to produce a lattice having squares of uniform division. By this method mat 1, a sectional elevation of which is diagrammatically shown in FIGURE 11, and which is provided with longitudinal reinforcements 2 and 2′ as well as with transverse reinforcements v, is produced.

While the invention is preferably applied to the reinforcement of thin, single layer sheets which, it will be understood particularly require reinforcement or strengthening, the invention is not limited thereto, since the operation and effect of the apparatus of the invention are quite independent of the thickness and structure of the sheet to be reinforced.

What we claim is:

1. The method of reinforcing a moving fibre glass mat having an adhesive binder material applied thereto with a plurality of staple glass fibre reinforcing elements comprising the steps of: traveling a set of the reinforcing elements in spaced relationship transversely above the moving mat, tensioning said reinforcing elements, lowering said tensioned reinforcing elements for deposit on to said mat, traveling said tensioned reinforcing elements parallel to said mat and in synchronism with the movement thereof, concomitantly with the transverse and vertical movement of said reinforcing elements to insure uniform disposition of said reinforcing elements on said mat, retracting said reinforcing elements after they have been deposited onto said mat to bring their ends adjacent one edge of said mat and severing said tensioned reinforcing elements deposited on said mat.

2. The method as defined in claim 1 including disposing the reinforcing elements in substantially parallel relationship, gripping the leading ends of said reinforcing elements and drawing them from a source of supply transversely above the moving mat.

3. Apparatus for continuously applying reinforcing elements in the form of staple glass fibres transversely to a glass fibre mat having an adhesive binder material thereon, comprising: a conveyor on which the mat is supported and moved, gripper means for engaging the reinforcing elements from a source of supply and drawing them for a predetermined distance in a direction across and above the conveyor, means cooperating with said gripper means to tension said reinforcing elements as they are drawn across said conveyor, means for lowering the gripper means to deposit said tensioned elements on to the mat carried by said conveyor, means for traveling said reinforcing elements parallel to and in timed relationship with the movement of said mat to insure uniform disposition on said mat, means for retracting said reinforcing elements after they have been deposited onto said mat to bring their ends adjacent one edge of said mat and means for severing the elements deposited on said mat from their source of supply.

4. Apparatus for continuously applying reinforcing elements in the form of staple glass fibres transversely to a glass fibre mat having an adhesive binder material thereon, comprising: means for holding the ends of a series of substantially parallel reinforcing elements, gripper means for engaging ends of a series of said reinforcing elements, a carriage on which said gripper means is mounted, means for moving said carriage transversely across and above said mat, means cooperating with said gripper means to tension said reinforcing elements as they are drawn transversely across said mat, means for moving said carriage in a vertical plane to deposit said tensioned reinforcing elements on to said mat, means for traveling said carriage parallel to and in synchronism with said mat, concomitantly with the transverse and vertical movement of said carriage to insure uniform disposition of said reinforcing elements on said mat, means for retracting said reinforcing elements after they have been deposited onto said mat to bring their ends adjacent one edge of said mat and means for severing said reinforcing elements adjacent the edges of said mat.

5. The invention as defined in claim 4, in which reinforcement is carried out in the form of staples on a warp-beam device.

6. Apparatus for continuously applying reinforcing elements in the form of staple glass fibres transversely to a glass fibre mat having an adhesive binder material thereon, comprising: means for holding the ends of a series of generally parallel reinforcing elements, gripper means for engaging ends of said reinforcing elements, a carriage on which said gripper means is mounted, means for moving said carriage transversely across and above said mat, means cooperating with said gripper means to tension said reinforcing elements as they are drawn transversely across said mat, means for moving said carriage in a vertical plane to deposit said tensioned reinforcing elements on to said mat, means for traveling said carriage parallel to and in synchronism with said mat concomitantly with the transverse and vertical movement of said carriage to insure uniform disposition of said reinforcing elements on said mat, means for retracting the reinforcing elements after they have been deposited onto said mat to bring their ends adjacent one edge of said mat and flame means for severing the reinforcing elements at the other edge of the mat.

7. Apparatus for continuously applying reinforcing elements in the form of staple glass fibres transversely to a glass fibre mat having an adhesive binder material thereon, comprising: two sets of gripper means for holding the ends of two series of reinforcing elements whereby one set of said gripper means for holding one associated series of reinforcing elements is provided on each side of said mat and disposed to engage their associated series of reinforcing elements alternatively, a carriage on which said gripper means are mounted, means for moving said carriage transversely across and above said mat, means cooperating with said gripper means to tension said reinforcing elements as they are drawn transversely across said mat, means for moving said carriage in a vertical plane to deposit said tensioned reinforcing elements onto said mat, means for traveling said carriage parallel to and in synchronism with said mat concomitantly with the transverse and vertical movement of said carriage to insure uniform disposition of said reinforcing elements on said mat, and means for severing said reinforcing elements adjacent the edges of said mat.

References Cited in the file of this patent

UNITED STATES PATENTS

| 1,192,568 | Scherf | July 25, 1916 |
| 1,368,588 | Wandel | Feb. 15, 1921 |
| 2,732,885 | Van Der Hoven | Jan. 31, 1956 |
| 2,753,598 | Slayter | July 10, 1956 |
| 2,936,022 | Stevenson | May 10, 1960 |

FOREIGN PATENTS

| 167,150 | Australia | Mar. 5, 1956 |